United States Patent Office 3,088,502
Patented May 7, 1963

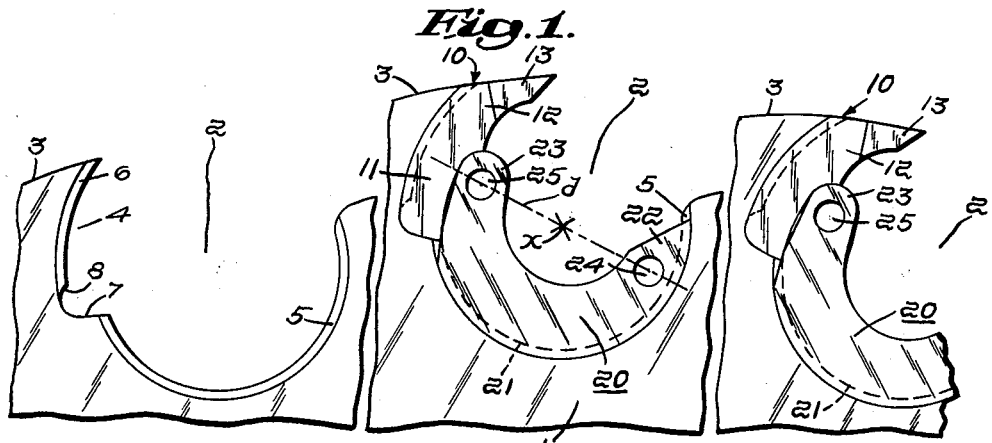
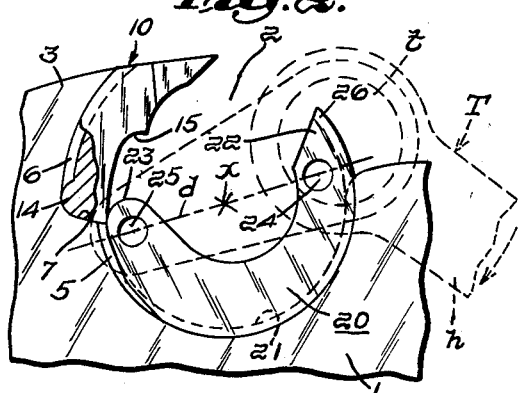
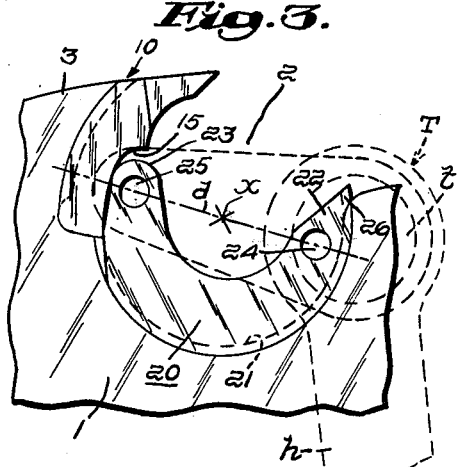
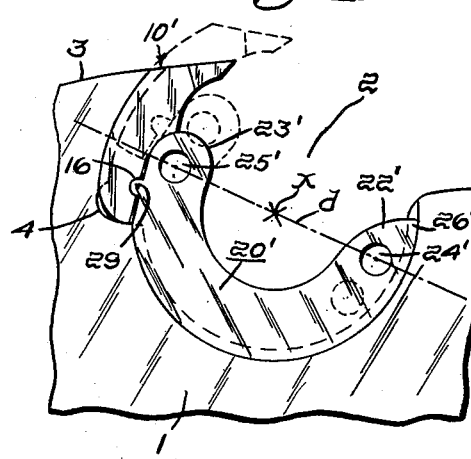
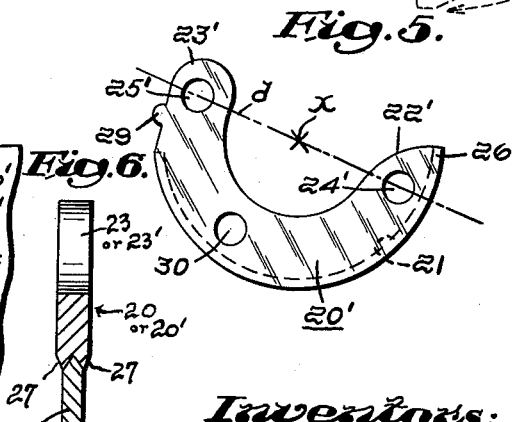

3,088,502
INSERTED TOOTH SAWS AND HOLDER ELEMENTS THEREFOR
Victor A. Kolesh, Holden, and Walter E. Lamlein, Leominster, Mass., assignors to Simonds Saw and Steel Company, Fitchburg, Mass., a corporation of Massachusetts
Filed July 14, 1961, Ser. No. 124,223
4 Claims. (Cl. 143—151)

This invention relates to saws of the inserted tooth type wherein tooth cutter elements known as bits are replaceably held in operative position in sockets at the edge of the saw plate or body by holder means cooperatively engaging the bits and the sockets in a strut-like fashion.

For saws of said class the invention aims to provide such holder means, herein termed shanks having new and improved operative structure and cooperative relation to the bits and to the saw plate, making for reduced frictional wear particularly on the saw plate sockets under insertion and removal of the parts, also affording opportunity for more positive holding interaction of the parts than heretofore available in keeping with manual removability, and providing for the shanks a capacity to accept manipulative engagement by different wrench-type tools including when desired the customary single-point or one-hole tool to shank engagement as by the usual one-pin tool as well as a novel plural-point shank-compressive engagement by plural-pin tool means especially adapted therefor, thus in effect giving the shanks a more versatile or universal character with respect to operative reception of an inserting and removing tool.

These and other advantages including improved chip and dust clearance will be apparent from the following description in connection with the accompanying drawings illustrating by way of example a number of embodiments of the invention, and wherein:

FIG. 1 is a side elevation of a portion of saw plate showing bits and shanks installed at two locations, with another receiving location or socket empty;

FIG. 2 is a similar view showing a partially assembled stage in the installation of a tooth bit and shank pair;

FIG. 3, a view similar to FIG. 2, shows a succeeding stage in such installation;

FIG. 4 is a view corresponding to part of FIG. 1 showing another shank embodiment as appropriate for a different tooth bit, with the fully installed position in full line, and an intermediate condition in broken line;

FIG. 5 is an elevation of a shank by itself and showing a modification applicable to the shanks of FIGS. 1 to 3 as well as of FIG. 4 for adapting them for manipulation by different wrenches and illustrating also a suitable location of a pin-receiving hole as appropriate for the usual single-pin tool and which hole may be either in addition to or in lieu of the hole pairs of the preceding views; and FIG. 6 is a cross-sectional view of an installed shank of any of FIGS. 1 to 5, taken along a radius at the mid region of the shank and showing the substantially uniform thickness thereof save for a swaged or other bevelling to smooth juncture with the side faces of the saw plate at the seating margin of the shank.

In the inserted-tooth type of saws as here concerned the parts carrying the cutting edges, such parts herein called the teeth proper or bits, are operatively retained in the saw by holder means herein called shanks. Pairs of such bits and shanks are installed in the parti-circular sockets along the margin of the circular or other saw plate such as 1 herein. As well known to those familiar with the art such installation of the insert tooth bit and shank elements must be extremely secure, with a tight fit, for keeping them in place in use, especially under the centrifugal forces attendant on the operation of circular saws, and in the face of the usual severely testing conditions for saw use as in the sawing of logs under the various climatic conditions in different geographical areas, including such instances as the sawing of frozen timber.

Such necessity for tightness of fit and securement have presented difficulties in the manipulation of the insert parts, particularly for replacements in the field, and has been the cause of undue wear of and damage to such parts and especially in the nature of a broaching action not only upon the insert parts but even more objectionably also upon the saw plates when assembling the bits and the shanks in the sockets. A major object of the present invention is to deal with said problem and to facilitate manipulation of the parts and particularly the holder shanks in such manner as to materially reduce the stresses and frictional resistance to which they have heretofore been subject during installation and removal and thereby to effect reduction of wearing and other damage of said parts and especially to obviate broaching or abrading of the saw plate in the region of the sockets, while at the same time to permit the use of greater locking friction and more positive holding of the parts and even the inclusion of knurled, serrate or other non-smooth locking surfaces.

Turning to the drawings in more detail, FIG. 1 represents a marginal portion of a circular saw plate 1 including several sockets 2 each adapted to receive a pair of the insert elements comprising a bit 10 and a holder or shank 20. The solid portions or lands 3 between successive sockets 2 constitute tooth bodies or abutments at which the bits 10 provide the cutter elements.

The sockets 2 each comprise a main and forward shank-holding and gullet-providing portion of circular contour. These sockets 2 extend inward from and intersect the saw plate periphery, with the main or shank-seating portion formed about a center spaced in the saw plate edge and located so that the total socket area comprises at least a semi-circle. Each socket 2 includes a lesser rear portion 4 shaped to receive and seat a bit 10. Said bit-seating area 4 as shown is on a larger radius than the other part of the socket and is approximately concentric or slightly eccentric with respect to said other socket part according to the desired holding action for the bits. The invention however is applicable to other constructions and arrangements of bit-conforming seats relative to the shank-receiving areas, including those wherein the socket areas for the shank and for the bit are defined by circumferential portions of one and the same circle.

The circular margin of the main portion of each socket 2 is provided with a circumferential V-shaped rib 5. Also the bit seating area 4 has a similar V-shaped rib 6 which extends from the periphery of the saw plate 1 inwardly to a point spaced above the bottom wall 7 of said area 4, at which point the V-rib 6 ends in a downwardly facing abutment 8 adapted to overlie and oppose a rearwardly facing boss 14 at the inner end of the corresponding bit 10.

The bits 10 in the illustrated examples are elongate generally arcuate metal pieces each comprising a leg 11, FIG. 1, and a head 12 with forwardly extending portion generally circumferential of the saw plate and terminating in a cutter tip 13. The bit rear walls are curved to fit the forward walls of the bit seats 4 and have each a central V-shaped groove conformant to the plate rib 6. The forward wall of each bit has formed at an intermediate location along it an arcuate forward facing recess 15 for abuttive thrust-receiving engagement with the rear terminal portion of the corresponding holder or shank 20 to be described.

In the example of FIGS. 1 to 3 the bits 10 have at the lower end the non-grooved rear-facing boss 14 previously mentioned, for reception below the down-facing abutment 8 on the saw plate and whereby the seated bit is positively held against upward or outward movement. In this instance installation of the insert parts is by first placing the bit 10 into its socket area 4 and then rotatively moving the shank 20 up over the lower forward wall of the bit, as represented in FIGS. 2 and 3. Turning of the shank into the locking installed position is upward with respect to the rear end of the shank, clockwise as viewed in FIGS. 1 to 3. The bits 10 and the socket areas 4 therefor may be and are shown as of the type of United States Patent No. 2,934,105 of Simonds Saw and Steel Company.

In the example of FIG. 4, also FIG. 5, the bits are formed without a rearward boss such as 14 of FIGS. 1 to 3, having instead a front notch 16 for interlocking with a nubbin 29 on the corresponding shank 20'. In such instances the insert parts are installed by fitting together a bit and a shank and then conjointly rotatively moving them in the socket, turning them downwardly with respect to the rear end of the shank, oppositely from the turning direction in FIGS. 1 to 3, and in this instance counterclockwise looking at FIG. 4. Bits of this FIG. 4 type also are shown in FIG. 8 of said Patent No. 2,934,105 and there referred to as standard for Simonds Inserted Tooth Head Saws.

The other elements of the insert pairs, namely the holders or shanks 20, with which the present invention is more particularly concerned, also comprise one-piece metal bodies externally circularly shaped with a radial dimension substantially the same as for the saw socket 2 in which it is to be installed by a rotative sliding and turning action. The convex exterior margin of each shank 20 has centrally formed along it a V-groove 21 for guiding interlock with the rib 5 of any socket 2. These shanks 20 are of a parti-annular or general C-shape overall, having a concave interior margin also of arcuate contour spaced inwardly from and generally paralleling the exterior margin, to define with the forward portion of the bits and the unoccupied area of the saw sockets 2 ample gullets for receiving and discharging shavings, chips and sawdust.

Further, the shanks 20 have an overall circumferential extent beyond the semi-circular, substantially in excess of 180°, such that the front and rear end portions 22 and 23 both extend beyond the diametral line, such as indicated at $d$ by the dot-dash line on the views, which demarks 180° of closed semi-annular shank body to one side thereof and the substantially equally extended shank end portions 22, 23 at the other side of said diameter, toward the open sector of the shank. In accordance with the invention the intermediate semi-annular body portion of the shank, that toward the socket bottom or closed side and below said diameter line $d$, is of generally uniform radial width and of substantially full width at least out to said diameter line. Moreover, the integral extent of the shank front end portion 22 and rear end portion 23 beyond said diameter line is of such dimension and shape circumferentially and also radially of the shank as there to provide integral masses of the metal of the shank for locating and affording supporting wall for at least the circumferentially outer half-portions of tool-engaging seats or apertures 24, 25 respectively which are thereby adapted to be formed in the shank end portions when a compression-type wrench is desired to be employed therewith.

Thus as illustrated in FIGS. 1 to 3, and also in FIGS. 4 and 5, the terminal shank portions 22, 23 each include a full semi-circular area defined by a radius from the centers of the tool holes 24, 25 and of a length at least equal to one-half the width of the shank intermediate body portion, said hole centers desirably lying upon or substantially in a diameter of the shank, such as the line $d$. The rear shank end 23, for abutment with the bit 10, has an arcuately convex contour of approximate semi-circular form fully about the tool hole 25 and convexly rounding forwardly and inwardly into the gullet to which it incidentally directs the inward course of chips and dust. The front shank end 22 has an equivalent encompassing area about and beyond the corresponding tool hole 24 and preferably with an additional terminal toe portion 26 partly along the main circular outer margin of the shank, for further abuttive engagement with the shank seating wall of the saw-plate socket 2, and partly along a rearwardly and inwardly extending line merging convexly into the interior concave contour of the shank and being outwardly tapered for facilitating the escape of chips and dust from the gullet under continuing rotation of the saw.

By thus extending the body material of the shanks 20 and 20' so as to continue the annular conformation thereof at substantially the equal width in the regions beyond a half-circle-defining diameter such as $d$, through the shank center of origin, marked $x$ in the views, the shanks are afforded the capacity to accept compressive force directly in line with such diameter, with maximum effect of resiliently compressing or springing the shank legs and end portions in the direction toward each other. Accordingly, when it is desired to provide the shanks with near-end diametrally aligned wrench-engaging formations such as the holes 24, 25 the shanks are enabled to be compressed in effect to a smaller diameter whereby to relieve the frictional binding or positive holding as between the walls of the shank V-grooves 21 and the V-ribs 5 of the main portions of the plate sockets 2, and also at the shank rear end portions 23 where sliding contact is made with the bits 10 in FIGS. 1 to 3, and likewise at V-ribs 6 of the plates and the V-grooves of the bits 10' when the parts are assembled as in FIG. 4. Hence while subject to such compression the shanks 20 and 20' are enabled to turn relatively freely within the sockets. Resultantly the operation of insertion and removal of the shanks and bits is greatly facilitated, and the heretofore damaging effects of broaching and galling at the sliding and abutting surfaces are largely overcome. This is in contrast to the previously unrelieved binding pressure on and between said surfaces during assembly and demounting of the insert parts heretofore causing said galling and broaching, and which has been particularly objectionable with respect to the relatively expensive saw plates.

In this connection it will be appreciated that by reason of the improved structural and functional pattern of the shanks as herein disclosed, including the circumferentially and radially augmented metal extension especially at the rear-end portions thereof and the shank conformation substantially as illustrated and described, whereby the application of compression at diametrically opposite locations on the shank is made readily possible, various additional advantages result. Among these are the enabling of a greater locking force than heretofore deemed practicable to become effective when the bit and shank elements are fully installed and released from the compression applying tool. Also, as earlier mentioned the improved provision for shank compression permits the use of higher-frictioned contactive surfaces as between the bits, the shanks and the saw plate, or even positive locking formations thereat, and also the use of a more positive locking angle for the bits with respect to their seats in the saw plate sockets.

Still further the improved shank conformation and arrangement enables use of a stronger or stiffer shank body with inherently increased resilient recovery force when released from compression, and as characterized by a thicker shank body in the direction transverse to the saw plate, with substantially uniform thickness throughout the entirety of the shank and radially thereacross to the mentioned swaged or bevelled marginal juncture with the generally thinner saw plate, as at 27, 27, FIG. 6. Thus any need is avoided for laterally projective reenforcement of portions of the shanks, as for example along the gullet-facing edge of the rear end in prior constructions and which entailed lateral shoulders at such regions with additional machining or other manufacturing operations which increased the cost of production. Likewise the shank body, as illustrated both in FIGS. 1 to 3 and FIGS. 4 and 5 is permissively of generally uniform radial width along the major length thereof and substantially continuously along the semi-annulus contained between the opposite ends of a given shank diameter line such as at *d* in the several views. Resultantly the entire shank structure is simplified and the manufacturing expense is importantly reduced.

In FIGS. 2 and 3 there is represented in phantom by the broken lines a tool T of a hand-bar wrench type in the nature of a shiftable spanner having a pair of relatively movable pins adapted for seating in the shank tool-receiving holes 24, 25 or 24', 25'. One tool pin is eccentrically disposed on a hub-like rotary tool part whereby turning of such part in one or the opposite direction by the tool handle *h* decreases or increases the span between the pins thereby respectively to apply and to release shank-compressing force while simultaneously turning the shanks 20 or 20' within the saw sockets 2. Such wrench is more fully shown and claimed in our application Serial No. 185,163, filed April 5, 1962, and copendent herewith.

The similar compressive manipulation is available also for the standard oppositely turning shank 20' of FIG. 4. There the shank has the similar conformation and beyond-semi-circular leg and end extent as described with reference to FIGS. 1 to 3. Instead of a hold-down stop member between the bit and the saw plate as in the example of FIGS. 1 to 3, the bits 10 of FIG. 4 as earlier mentioned have a front notch 16 engageable with a rearwardly projecting nubbin 29 on the rear end of the shank 20'. In this instance the tool such as T with the pins thereof placed in the tool-engaging holes 24', 25', at the opposite ends of a diameter similarly as in FIGS. 1 to 3, is turned in the reverse directions from those of FIGS. 1 to 3 respectively for compressing and for releasing the shank.

It is here noted that the shanks of the extended C-form constructed, shaped and arranged as above described with reference both to FIGS. 1 to 3 and to FIG. 4 and including particularly the beyond-semi-circular terminal extensions circumferentially and radially, may be supplied without provision of the special tool-engaging holes such as 24, 25 and 24', 25' therein and having instead the customary single tool-engaging hole at a closed portion of the shank body such as indicated at 30 on the separately illustrated shank 20' of FIG. 5. Such single-hole shank but otherwise incorporating the improved compressive beyond-semi-circular shape and construction including the extended terminal structure illustrated and described may be preferred by some users including those not equipped with a special movable-pin spanner-like wrench as above referred to. Further, the shanks of the invention whether of the general type of FIG. 3 or of FIG. 4 may be supplied in a universal form adapting them for insertive manipulation either by the use of a one-pin tool or by the use of a compressive plural-pin tool. Accordingly in FIG. 5 a shank 20' is illustrated in such universal form having both the across-diameter near-terminal tool holes 24', 25' and in addition the more nearly central hole 30 as appropriate for various existing insert tooth installing tools. It will be understood that the similar universal character, as to tool engagement, may be provided for the shanks 20 of FIGS. 1 to 3, similarly for example as in FIG. 5, and that also as stated the outer or near-end tool-engaging holes may be omitted from the shanks of either embodiment herein shown and described by way of example, said shanks otherwise having the improved compressive capacity and augmented circumferential and radial extent and conformation and ample well-formed gullet area as assisted by the convex terminal surfaces for the shanks in accordance with the invention as herein disclosed.

Our invention is not limited to the particular embodiments thereof illustrated and described herein, and we set forth its scope in our following claims.

We claim:

1. A holder shank for a tooth bit to be inserted in a generally part-circular edge socket of a saw plate, said shank comprising an integral one-piece steel body of partial annular shape encompassing in excess of 180° of arc, said body including opposite end portions and an arcuate intermediate portion between them, said end and intermediate portions having a common convex circular outer margin formed on a radius for acceptance in the saw socket in which the shank is to be inserted and having a generally parallel concave inner margin to define a gullet area when inserted in such saw socket, the width of the shank body between said outer and inner margins at all radii from the outer margin center being adequate to provide capacity for the shank to operate as a bit-holding strut along a diameter through said center and across said shank end portions while further adapting it to be resiliently compressed at such diameter and symmetrically with respect to the mid-length region of the shank, and said shank end portions each having an extent circumferentially and widthwise of the shank outwardly beyond said diameter to afford locations thereat for and having therein wrench-pin-receiving recesses respectively centered substantially on said shank diameter and to provide around said recesses integral metal wall structure adequate to accept shank-compressive force to be applied along said diameter by relatively movable wrench pins inserted in said recesses and forced toward each other for relieving the shank of edge friction against a saw plate socket in the bodily rotative installation and removal of the shank into and from such socket.

2. For use in an insert tooth saw having distributed along the edge of the saw plate parti-circular sockets each including at the rear thereof a seat for the corresponding tooth bit, (*a*) a shank for bit-holding rotative reception in such socket, (*b*) said shank comprising a single integral steel body with substantially parallel side faces for paralleling the saw plate sides and of general C-shape semi-annulus form with convex outer margin generally conformant to the saw sockets, (*c*) said shank body subtending more than 180° of arc about a center on which said convex outer margin of the body is formed, said shank body being of substantially uniform thickness in the direction between its faces over the major radial width thereof, (*d*) and being of generally uniform radial width throughout the extent thereof between the opposite ends of a semi-circle-defining diameter line through said center of the convex outer shank margin, with the inner concave and generally circular margin defining an outwardly opening gullet cavity, (*e*) said shank body having front and rear terminal portions outwardly projecting substantially beyond said semi-circle-defining diameter line, (*f*) each said terminal portion having therein and centered on said diameter line a wrench-pin-receiving aperture sufficient in size each to accept one of a pair of relatively movable wrench pins of adequate size and strength to impose shank compressing pressure across the shank along said diameter line and symmetrically with respect to the medial region of the shank when the pins are subjected to a leverage force sufficient to cause them to approach each other along said line for such shank compression, (*g*) and said terminal shank portions having an area and extent to present around said apertures thereof fully encompassing pin-opposing wall metal of a dimensional extent in the plane of the shank and radially of the surrounded aperture at least equal to a radius of such aperture and such as to withstand said compressive pressure, (h) whereby the shank and associated bit are adapted to be preliminarily set edgewise into a saw plate socket and the shank thereupon to be bodily rotated into bit holding operative position in the socket while subject to shank-compressing pressure of such relatively movable wrench pins inserted in said diametrically opposed shank apertures and brought together so as to relieve the shank and saw plate of the major frictional resistance between them to bodily turning of the shank.

3. A bit-holding shank for an insert tooth saw according to claim 2 wherein the rear terminal portion of the shank presents in the installed position thereof a shoulder which extends forwardly and then inwardly in an arcuately rounded manner into the gullet cavity of the shank so as to guide chips and dust inwardly thereto and away from the region of contact of the shank with the bit held by it.

4. A bit-holding shank for an insert tooth saw according to claim 2 wherein a further tool-pin receiving aperture is provided at an intermediate portion of the shank substantially spaced inwardly from the front and rear terminal portions thereof and adapting the same shank for installation in a plurality of manners.

References Cited in the file of this patent
UNITED STATES PATENTS

| | | |
|---|---|---|
| 286,478 | O'Grady | Oct. 9, 1883 |
| 361,142 | Dalton | Apr. 12, 1887 |
| 682,614 | Harris | Sept. 17, 1901 |
| 2,787,300 | Kopp | Apr. 2, 1957 |
| 2,934,105 | Ferguson | Apr. 26, 1960 |